(12) United States Patent
Carrithers

(10) Patent No.: US 8,700,249 B1
(45) Date of Patent: Apr. 15, 2014

(54) METHOD AND SYSTEM FOR FUEL ROUTE PLANNING

(76) Inventor: Jeffrey A. Carrithers, Taylorsville, KY (US)

( * ) Notice: Subject to any disclaimer, the term of this patent is extended or adjusted under 35 U.S.C. 154(b) by 1043 days.

(21) Appl. No.: 12/339,792

(22) Filed: Dec. 19, 2008

Related U.S. Application Data

(60) Provisional application No. 61/083,571, filed on Jul. 25, 2008.

(51) Int. Cl.
*G01C 23/00* (2006.01)
*G05D 1/00* (2006.01)
*G05D 3/00* (2006.01)
*G06F 7/00* (2006.01)
*G06F 17/00* (2006.01)
*G01C 22/00* (2006.01)

(52) U.S. Cl.
USPC ................................ 701/25; 701/3; 701/26

(58) Field of Classification Search
USPC .......................................................... 701/25
See application file for complete search history.

(56) References Cited

U.S. PATENT DOCUMENTS

| | | | |
|---|---|---|---|
| 4,433,544 A | | 2/1984 | Wells et al. |
| 4,774,670 A | * | 9/1988 | Palmieri ............................ 701/3 |
| 4,791,281 A | | 12/1988 | Johnsen et al. |
| 4,827,419 A | * | 5/1989 | Selby, III ........................ 701/528 |
| 5,208,590 A | * | 5/1993 | Pitts ............................... 340/973 |
| 5,245,534 A | | 9/1993 | Waterhouse et al. |
| 5,581,464 A | | 12/1996 | Woll et al. |
| 5,642,279 A | | 6/1997 | Bloomberg et al. |
| 5,842,142 A | * | 11/1998 | Murray et al. ................... 701/16 |
| 6,173,046 B1 | | 1/2001 | Jagadish et al. |
| 6,244,540 B1 | * | 6/2001 | Stabile et al. ............... 244/118.5 |
| 6,253,601 B1 | | 7/2001 | Wang et al. |
| 6,463,383 B1 | * | 10/2002 | Baiada et al. .................. 701/120 |
| 6,487,497 B2 | | 11/2002 | Khavakh et al. |
| 6,519,527 B2 | * | 2/2003 | Shinagawa ..................... 701/411 |
| 6,523,021 B1 | | 2/2003 | Monberg et al. |
| 6,542,796 B1 | * | 4/2003 | Gibbs et al. ........................ 701/3 |
| 6,636,798 B2 | | 10/2003 | Biess et al. |
| 6,637,648 B1 | | 10/2003 | Gilgen et al. |
| 6,690,299 B1 | * | 2/2004 | Suiter ............................ 340/973 |
| 6,691,105 B1 | | 2/2004 | Virdy |
| 6,728,607 B1 | | 4/2004 | Anderson |
| 6,952,647 B2 | | 10/2005 | Hasegawa et al. |
| 7,155,339 B2 | * | 12/2006 | Tu .................................. 701/426 |
| 7,174,301 B2 | | 2/2007 | Florance et al. |
| 7,194,432 B1 | | 3/2007 | Ritter et al. |
| RE39,618 E | | 5/2007 | Levine |
| 7,225,076 B2 | | 5/2007 | Sugawara |
| 7,246,109 B1 | | 7/2007 | Ramaswamy |

(Continued)

*Primary Examiner* — Bhavesh V Amin
*Assistant Examiner* — Nicholas Kiswanto
(74) *Attorney, Agent, or Firm* — Hovey Williams LLP

(57) ABSTRACT

A method for fuel route planning is implemented on a system including: a dispatch computer for interfacing with a fuel route plan user; and a central server computer in communication with the dispatch computer through a network. The central server computer is for: receiving an origin airport and a destination airport for a flight of an aircraft; determining a flight trajectory between the origin airport and the destination airport; retrieving a plurality of refueling airports located adjacent to the flight trajectory; retrieving fuel price information associated with a plurality of FBOs located at the plurality of refueling airports; presenting the flight trajectory and the plurality of refueling airports on an aeronautical/geospatial map; and displaying the fuel price information associated with the plurality of FBOs located at the plurality of refueling airports for use in compiling a fuel route plan.

20 Claims, 12 Drawing Sheets

(56) References Cited

U.S. PATENT DOCUMENTS

| | | |
|---|---|---|
| 7,283,735 B2 | 10/2007 | Pomeroy et al. |
| 7,305,417 B2 | 12/2007 | Gray |
| 7,330,788 B2 | 2/2008 | Mikuriya et al. |
| 7,336,274 B2 | 2/2008 | Kida |
| 7,337,062 B2 | 2/2008 | Ohnishi et al. |
| 7,349,892 B1 | 3/2008 | Virdy |
| 7,366,290 B2 | 4/2008 | Ritter et al. |
| 7,373,244 B2 | 5/2008 | Kreft |
| 8,332,136 B2 * | 12/2012 | Baker et al. ................... 701/400 |
| 2002/0177943 A1 * | 11/2002 | Beardsworth ................. 701/120 |
| 2005/0216139 A1 * | 9/2005 | Laughlin et al. .................. 701/3 |
| 2007/0095890 A1 * | 5/2007 | Elefant ........................ 235/378 |
| 2008/0243318 A1 * | 10/2008 | Ferro et al. ..................... 701/11 |
| 2008/0312776 A1 * | 12/2008 | Sylvester ......................... 701/3 |
| 2009/0125222 A1 * | 5/2009 | McCullough et al. ........ 701/120 |
| 2009/0164347 A1 * | 6/2009 | Sison et al. ..................... 705/30 |
| 2010/0106399 A1 * | 4/2010 | Waeller et al. ................ 701/201 |

\* cited by examiner

METHOD AND SYSTEM FOR FUEL ROUTE PLANNING

CROSS-REFERENCE TO RELATED APPLICATIONS

This application claims the benefit of U.S. Provisional Patent Application No. 61/083,571, filed Jul. 25, 2008, the entire disclosure of which is hereby incorporated by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

1. Field of the Invention

The field of the disclosure relates generally to aviation fuel route planning.

2. Background Art

Aviation fuel is available at Fixed Based Operators (FBOs), located at airports. Fuel costs vary by region and airport and, because of price volatility, are difficult to plan. There are approximately 7,000 FBOs in the USA. In 2006, these FBOs dispensed an estimated 1.4 billion gallons of aviation fuel in the USA, representing $6.3 Billion in revenues.

Cost of fuel for operating a general aviation aircraft has increased from 32% (2007) of the operation budget to 70% (2008) in one year. With the probability of fuel prices continuing to increase, flight department managers are looking for ways to maximize efficiencies and reduce their fuel cost. According to Conklin & de Decker, fuel cost for a Cessna Citation CJ2 (a small corporate aircraft), flying a typical 485 hours per year, is around $337,000 per year (data as of 2007).

In 2007, an estimated 190,100 general aviation aircraft will be in active use in the U.S.A. According to the Federal Aviation Administration (FAA), 27,400 corporations owned at least one fixed wing aircraft in the U.S.A. The total aviation expenditures of all corporations with less than 2 aircraft are approximately $12.5 Billion. In the U.S.A., there are approximately 2,880 corporate flight departments that own more than 2 aircraft. On average, these flight departments own 3.3 aircraft and employ 10 people. These multi-aircraft flight departments combined spend $4.3 Billion to manage, operate, and maintain their 9,400 aircraft. The average budget is $545,000 per aircraft per year. Aside from aircraft owned by corporate entities, there are more than 153,000 aviation enthusiasts that own a private aircraft. Private aircraft owners spend more than $6.1 Billion per year. Like aircraft owned by businesses, private aircraft owners also purchase their aviation fuel at FBOs.

Currently, there is no central repository where day-to-day, cost-responsive fuel information comes together as a coherent whole. As a result, the supply and demand of aviation fuel lacks coordination and efficiency, which makes flying more expensive. To find a reliable fuel supply at the lowest possible cost is almost impossible because the information is fragmented, dispersed, and not readily accessible. Owners of small aircraft and dispatchers in corporate flight departments currently must call or email all the FBOs in a given area to request details of current fuel prices and what discounts are available. Especially on multi-stop missions, this effort is excessively time consuming and can become an overwhelming burden in planning flight operations.

Additionally, when planning flight operations, flight planners must also do a considerable amount of research to find airports that meet the aircrafts requirements for landing and takeoff distances, how far they are away from their final destination and a myriad of other information required to fly safely into a specific airport. For instance, according to the FAA, there are approximately 19,850 public and private airports in the U.S.A., of which 8,770 have paved runways.

Although there are websites that gather and publish some aviation fuel prices at airports, there is no system that integrates this information with geospatial mapping in fuel route planning. Moreover, these websites do not determine qualified airports based on the range of the aircraft and the flight trajectory from an origin airport.

BRIEF SUMMARY OF THE INVENTION

The system and method of the present invention will allow aircraft owners, pilots, dispatchers, and flight department managers to easily secure the most economic fuel supply and make better routing decisions to make fuel route planning more economical, efficient, and predictable. The development of a fuel route planner will increase efficiencies in the operations of the aircraft by allowing dispatchers to route their flights into airports with the best fuel prices. The system gives the user a graphical display with fuel options within range of an aircraft along the flight trajectory of the aircraft.

This system of the present invention integrates two databases (airports and FBOs) with a geospatial mapping interface. Using a coordinate system (latitude and longitude), the system locates airports within a corridor relative to a flight trajectory and reports the fuel prices on those airports.

Although this disclosure emphasizes the features and advantages of the demand side (aircraft owners, flight departments, etc.), the system also has features and advantages for the supply side (FBOs). As the fuel route planning system enables the coordination of the supply and demand of aviation fuel, it gives smaller and less well known FBOs the ability to be competitive with larger regional airports' FBOs. In addition, the fuel route planning system enables making fuel reservations by aircraft owners or flight dispatchers, securing fuel availability. For FBOs, the fuel reservation capability offers improved demand forecasting, fuel inventory management, and higher fuel inventory turnover.

According to one aspect of the invention, a method for fuel route planning includes: receiving an origin airport and a destination airport for a flight of an aircraft; determining a flight trajectory between the origin airport and the destination airport; retrieving, from an airport information database, a plurality of refueling airports located adjacent to the flight trajectory; retrieving, from an FBO information database, fuel price information associated with a plurality of FBOs located at the plurality of refueling airports; rendering the flight trajectory and the plurality of refueling airports on an aeronautical/geospatial map using information from an aeronautical/geospatial mapping information database; and displaying the fuel price information associated with the plurality of FBOs located at the plurality of refueling airports for use in compiling a fuel route plan.

According to one implementation, the method further includes receiving an aircraft range indicating a maximum distance that the aircraft can safely fly; determining a determined refueling airport from the plurality of refueling airports based on the aircraft range; and displaying the determined refueling airport on the aeronautical/geospatial map.

The method may also include: displaying on the aeronautical/geospatial map alternate airports within a predetermined range of the determined refueling airport; retrieving, from the FBO information database, fuel price information associated with FBOs located at the alternate airports; and displaying the fuel price information associated with the FBOs located at the alternate airports. Displaying the fuel price information associated with the FBOs located at the alternate airports may include displaying a list of the FBOs sorted by the fuel price information to aid identification of an FBO having a least expensive fuel price. Still further, the method may include receiving a selection of one of the alternate airports and substituting, in the fuel route plan, the one of the alternate airports for the refueling airport. The destination airport may be the refueling airport.

The method may further include: displaying on the aeronautical/geospatial map additional airports within a predetermined range of a selected set of coordinates; retrieving, from the FBO information database, fuel price information associated with FBOs located at the additional airports; and displaying the fuel price information associated with the FBOs located at the additional airports. Displaying the fuel price information associated with the FBOs located at the additional airports may include displaying a list of the FBOs sorted by the fuel price information to aid identification of an FBO having a least expensive fuel price. The method may further include receiving a selection of one of the additional airports and adding the one of the additional airports to the fuel route plan.

According to another implementation, the method further includes determining a fuel target area within which the aircraft must refuel to reach the destination airport. Determining the fuel target area may include: determining a fuel corridor having boundaries based on a lateral deviation value from the flight trajectory; if a distance between the origin airport and the destination airport is less than twice the aircraft range, then determining the fuel target area as being within the fuel corridor and bounded by a first distance limit based on the aircraft range from the origin airport and a second distance limit based on the aircraft range from the destination airport; and if the distance between the origin airport and the destination airport is greater than or equal to twice the aircraft range, then determining the fuel target area as being within the fuel corridor and bounded by the origin airport and the first distance limit based on the aircraft range from the origin airport, making an airport of an FBO selected for refueling a new origin airport, and repeating until the destination airport is reached.

In accordance with yet another implementation, the method includes: obtaining a runway length requirement for the aircraft; and filtering, using the runway length requirement for the aircraft, the plurality of refueling airports retrieved from the airport information database to include only refueling airports having a runway of sufficient length to accommodate the aircraft.

In yet another implementation, the method includes: obtaining a fuel type requirement for the aircraft; and filtering, using the fuel type requirement for the aircraft, the plurality of refueling airports retrieved from the airport information database to include only refueling airports having an FBO having fuel of a required fuel type for the aircraft.

In still yet another implementation, the method includes: receiving, from a plurality of FBOs, fuel price information; and saving the fuel price information from the plurality of FBOs in the FBO information database.

In accordance with yet another implementation, the method includes communicating a fuel reservation to a selected FBO in response to receiving a request to make the fuel reservation at the selected FBO.

According to another aspect of the invention, a system for fuel route planning includes: a dispatch computer executing a dispatch user interface for interfacing with a fuel route plan user; and a central server computer in communication with the dispatch computer through a network. The central server computer is for: receiving, from the fuel route plan user via the dispatch user interface, an origin airport and a destination airport for a flight of an aircraft; determining a flight trajectory between the origin airport and the destination airport; retrieving, from an airport information database, a plurality of refueling airports located adjacent to the flight trajectory; retrieving, from an FBO information database, fuel price information associated with a plurality of FBOs located at the plurality of refueling airports; presenting, to the fuel route plan user via the dispatch user interface, the flight trajectory and the plurality of refueling airports on an aeronautical/geospatial map using information from an aeronautical/geospatial mapping information database; and displaying, to the fuel route plan user via the dispatch user interface, the fuel price information associated with the plurality of FBOs located at the plurality of refueling airports for use in compiling a fuel route plan.

In accordance with one implementation, the central server computer is further for: receiving, from the fuel route plan user via the dispatch user interface, an aircraft range indicating a maximum distance that the aircraft can safely fly; determining a determined refueling airport from the plurality of refueling airports based on the aircraft range; and displaying, to the fuel route plan user via the dispatch user interface, the determined refueling airport on the aeronautical/geospatial map.

In accordance with another implementation, the central server computer is further for: receiving, from the fuel route plan user via the dispatch user interface, information to determine a runway length requirement for the aircraft; and filtering, using the runway length requirement for the aircraft, the plurality of refueling airports retrieved from the airport information database to include only refueling airports having a runway of sufficient length to accommodate the aircraft.

In accordance with yet another implementation, the central server computer is further for: receiving, from the fuel route plan user via the dispatch user interface, a fuel type requirement for the aircraft; and filtering, using the fuel type requirement for the aircraft, the plurality of refueling airports retrieved from the airport information database to include only refueling airports having an FBO having fuel of a required fuel type for the aircraft.

In accordance with still yet another implementation, the system further includes an FBO computer at each FBO, each FBO computer in communication with the central server computer through the network and executing an FBO user interface for interfacing with a respective FBO user. In this configuration, the central server computer is further for: receiving, from each respective FBO user via a respective FBO user interface, fuel price information; and saving the fuel price information in the FBO information database.

In accordance with a further implementation, the central server computer is further for: receiving, from the fuel route plan user via the dispatch user interface, a request to make a fuel reservation with a selected qualified FBO; and communicating the request to make the fuel reservation to the selected qualified FBO.

BRIEF DESCRIPTION OF THE SEVERAL
VIEWS OF THE DRAWINGS

Exemplary embodiments of the invention will hereafter be described with reference to the accompanying drawings, wherein like numerals denote like elements.

DETAILED DESCRIPTION OF EXEMPLARY
EMBODIMENTS OF THE INVENTION

Figure 1:
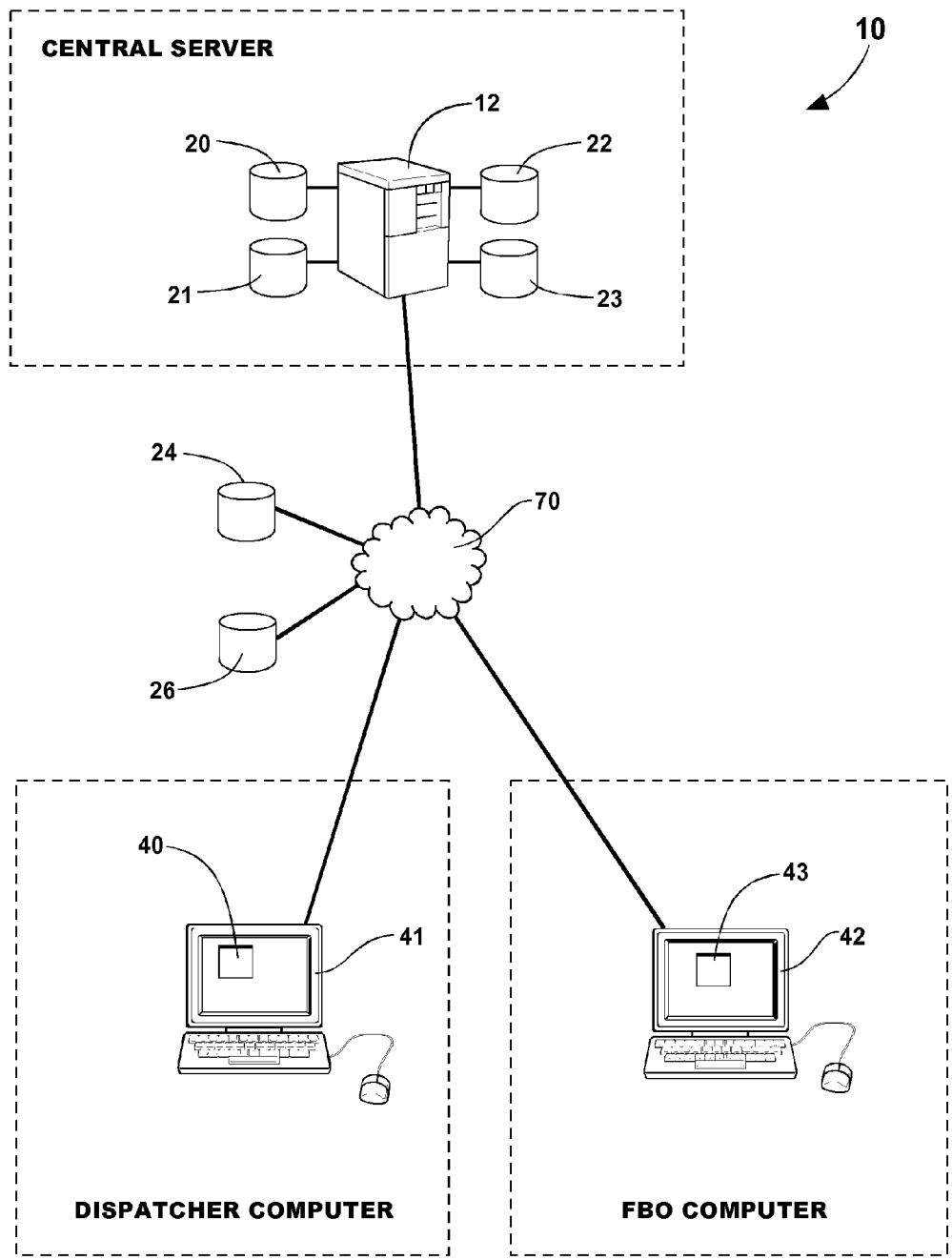
FIG. 1 is a functional block diagram of an exemplary system according to the invention.

FIG. 1 is a functional block diagram of an exemplary system 10 for minimizing aviation fuel cost using geospatial mapping in fuel route planning. The exemplary system 10 includes a central server computer 12, a dispatch computer 41 and an FBO computer 42 in communication with each other through a network 70, such as the Internet.

In communication with the central server computer 12 are: an airport information database 20 for storing airport information such as airport locations and lengths of available runways; an FBO information database 21 for storing FBO information such as fuel types, prices and inventories; and an aeronautical/geospatial mapping information database 22 for storing aeronautical/geospatial mapping information for rendering maps. Of course, any or all of the airport information database 20, the FBO information database 21, and the aeronautical/geospatial mapping information database 22 can be combined into a combined database without departing from the spirit or the scope of the claimed invention.

The central server computer 12 is configured to execute instructions that cause the central server computer 12 to perform processes, operations, and actions of fuel route planning as described below. The central server computer 12 is further in communication with a temporary memory buffer 23 which stores intermediate results and values.

The dispatch computer 41 is used by pilots, dispatchers, or flight planners to create a fuel route plan. The dispatch computer 41 executes an application, such as a web browser, that serves as a dispatch user interface 40 to the fuel route planning processes, operations and actions that are performed by the central server computer 12.

The FBO computer 42 is used by FBO managers to report fuel prices and fuel inventories. The FBO computer 42 executes an application, such as a web browser, that serves as an FBO user interface 43 for a user, such as an FBO manager, to report fuel price information and levels of inventory to the central server computer 12. The fuel price information and levels of inventory are stored in the FBO information database 21.

The exemplary system 10 further includes an official airport information database 26 accessible through the network 70 which stores official airport information sanctioned by the Federal Aviation Administration. Periodically, the central server computer 12 queries the official airport information database 26 for updates of airport information and stores those updates in the airport information database 20.

The exemplary system 10 further includes an official aeronautical/geospatial maps database 24 which stores official aeronautical/geospatial maps sanctioned by the Federal Aviation Administration. Periodically, the central server computer 12 queries the official aeronautical/geospatial maps database 24 for updates to the official aeronautical/geospatial mapping information, and stores those updates in the aeronautical/geospatial mapping information database 22.

Figure 2:
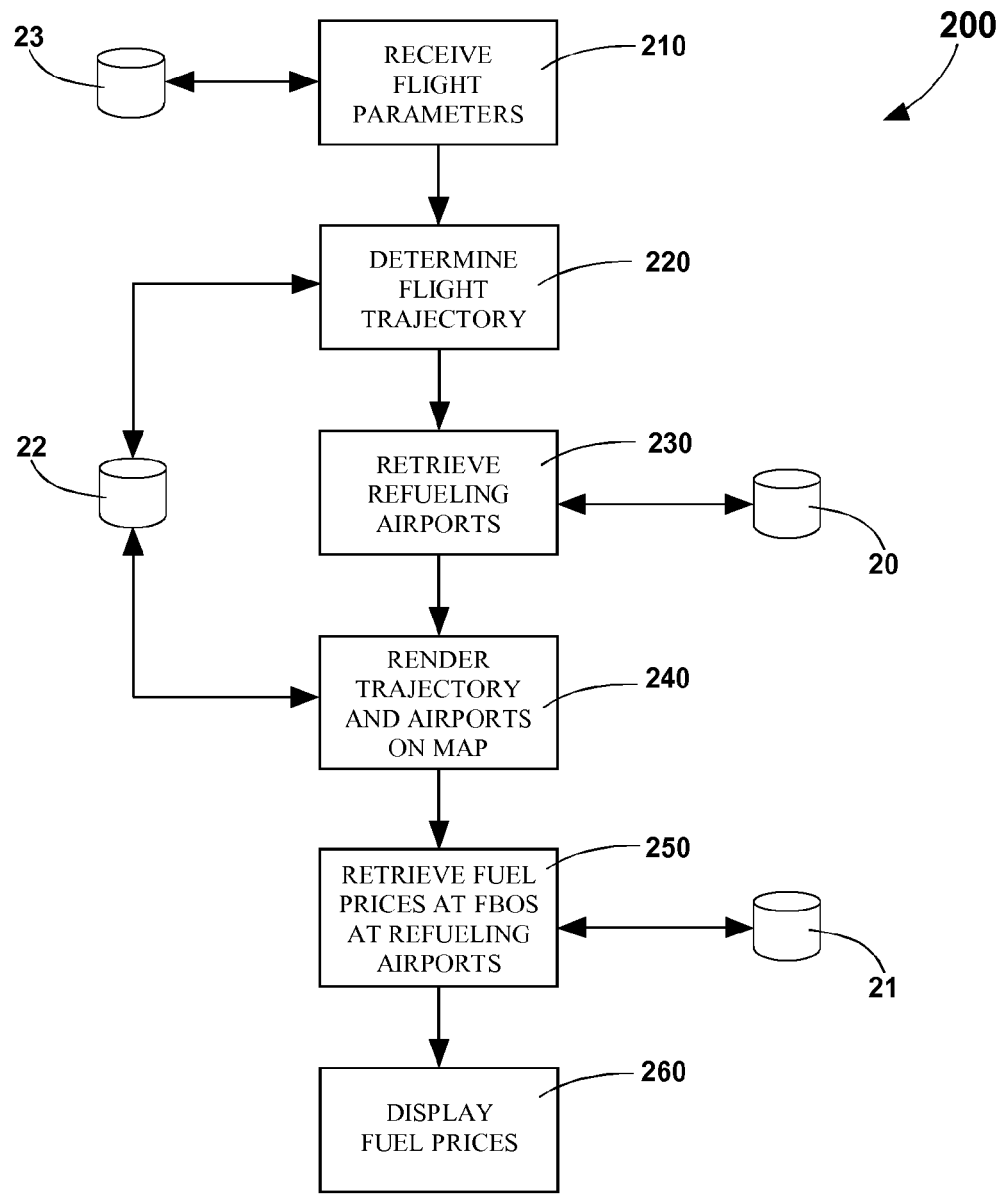
FIG. 2 is a flow diagram of an exemplary method according to the invention.

FIG. 2 is a flow chart of an exemplary method 200 for minimizing aviation fuel cost by using geospatial mapping in fuel route planning, in accordance with the present invention. The exemplary method 200 includes the steps of: 210 receiving, from the fuel route plan user via the dispatch user interface 40 (FIG. 1), flight parameters, including an origin airport and a destination airport for a flight of an aircraft; 220 determining a flight trajectory between the origin airport and the destination airport; 230 retrieving, from the airport information database 20 (FIG. 1), a plurality of refueling airports located adjacent to the flight trajectory; 240 rendering and presenting, to the fuel route plan user via the dispatch user interface 40 (FIG. 1), the flight trajectory and the plurality of refueling airports on an aeronautical/geospatial map using information from the aeronautical/geospatial mapping information database 22 (FIG. 1); 250 retrieving, from the FBO information database 21 (FIG. 1), fuel price information associated with a plurality of FBOs located at the plurality of refueling airports; and 260 displaying, to the fuel route plan user via the dispatch user interface 49 (FIG. 1), the fuel price information associated with the plurality of FBOs located at the plurality of refueling airports for use in compiling a fuel route plan. Advantageously, the desired FBO(s) for a fuel route plan can be selected using the displayed fuel price information.

Figure 3:
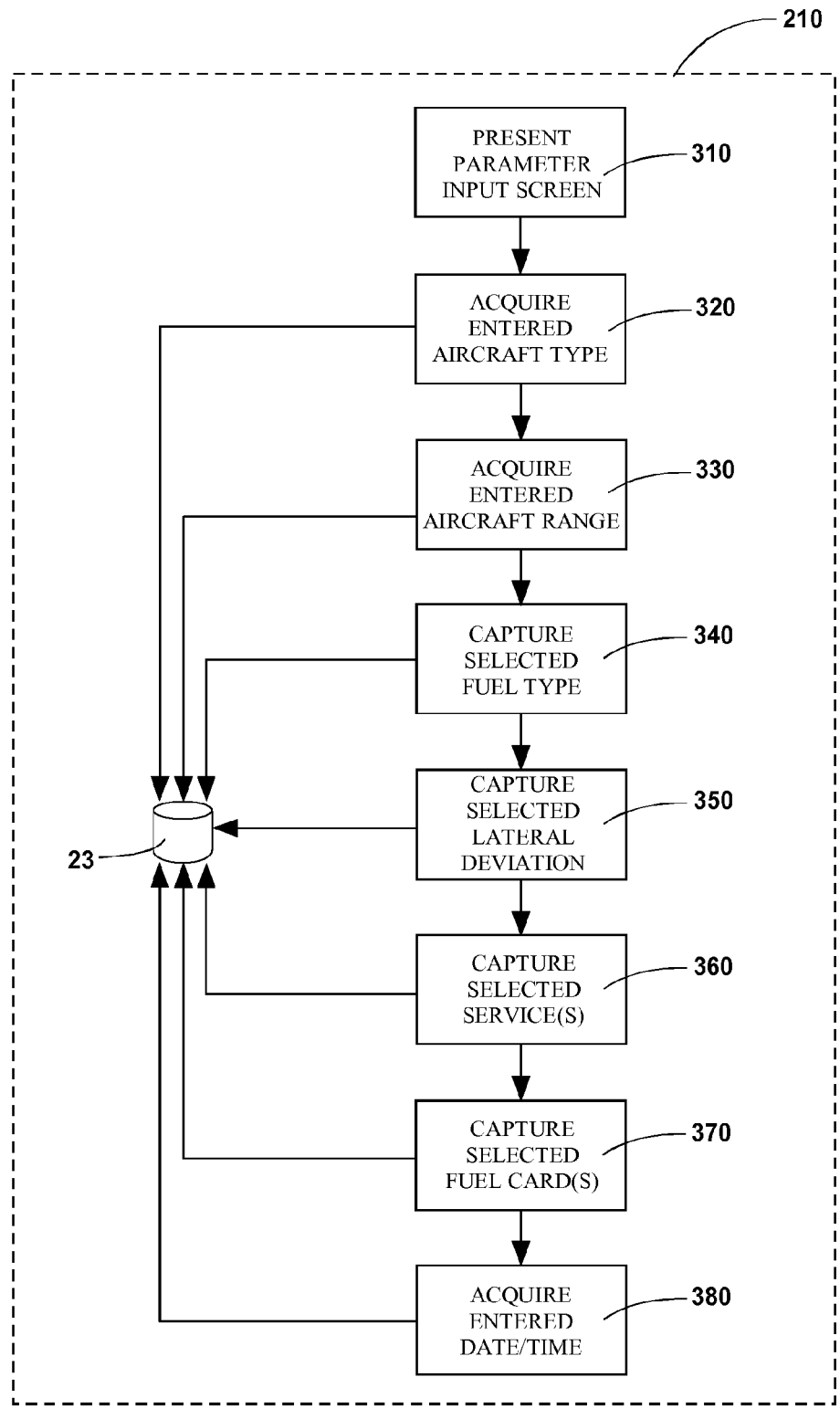
FIG. 3 is a diagram showing a number of steps and types of flight parameters that may be acquired.

FIG. 3 is a diagram further showing a number of steps and types of flight parameters that may be acquired or received from the user in step 210 receiving flight parameters from a user via the dispatch user interface 40 (FIG. 1). The user is typically a pilot or flight department dispatcher. In step 310, the central server computer 12 (FIG. 1) presents a parameter input screen to the user via the dispatch user interface 40. In another step 320, the central server computer 12 receives an aircraft type from the user. The aircraft type information is useful for at least two reasons: 1) each aircraft type has specific requirements for the runway length; and 2) each aircraft type uses a specific type of fuel (options include 100 LL and JetA). This information is available to the central server computer 12 from an aircraft type database (not shown). In another step 340, the user selects/enters the type of fuel manually (the system will set the default based on the aircraft type). The runway length and type of fuel, as associated with the aircraft type, is later used as an airport qualification criterion. In another step 330, the central server computer 12 receives aircraft range information from the user. The aircraft range is the maximum distance the aircraft can safely fly. The aircraft range depends on numerous variables, including the aircraft type, the load carried (number of passengers, amount of luggage, amount of fuel), flight altitude, flight speed, etc. In another step 350, the central server computer 12 receives lateral deviation information from the user. Lateral deviation information is the distance from the flight trajectory within which to search for qualified airports and FBOs. The exemplary system 10 uses the lateral deviation information to determine a fuel corridor in which to search for qualified airports and FBOs. Optionally, in step 360, the user selects/enters FBO services desired, such as catering, interior cleaning, or aircraft maintenance. Further, in step 370, the user has the option to select/enter preferred fuel cards that may offer discounts or other benefits. Finally, in step 380, if the user desires to make fuel reservations, the user enters the date and time of the flight. The user can select/enter these parameters in any sequence. All parameters are stored in the temporary memory buffer 23 (FIG. 1).

Advantageously, the aircraft range is used by the exemplary system 10 in determining a determined refueling airport from the plurality of refueling airports based on the aircraft range, and displaying the determined refueling airport on the aeronautical/geospatial map.

Figure 4:
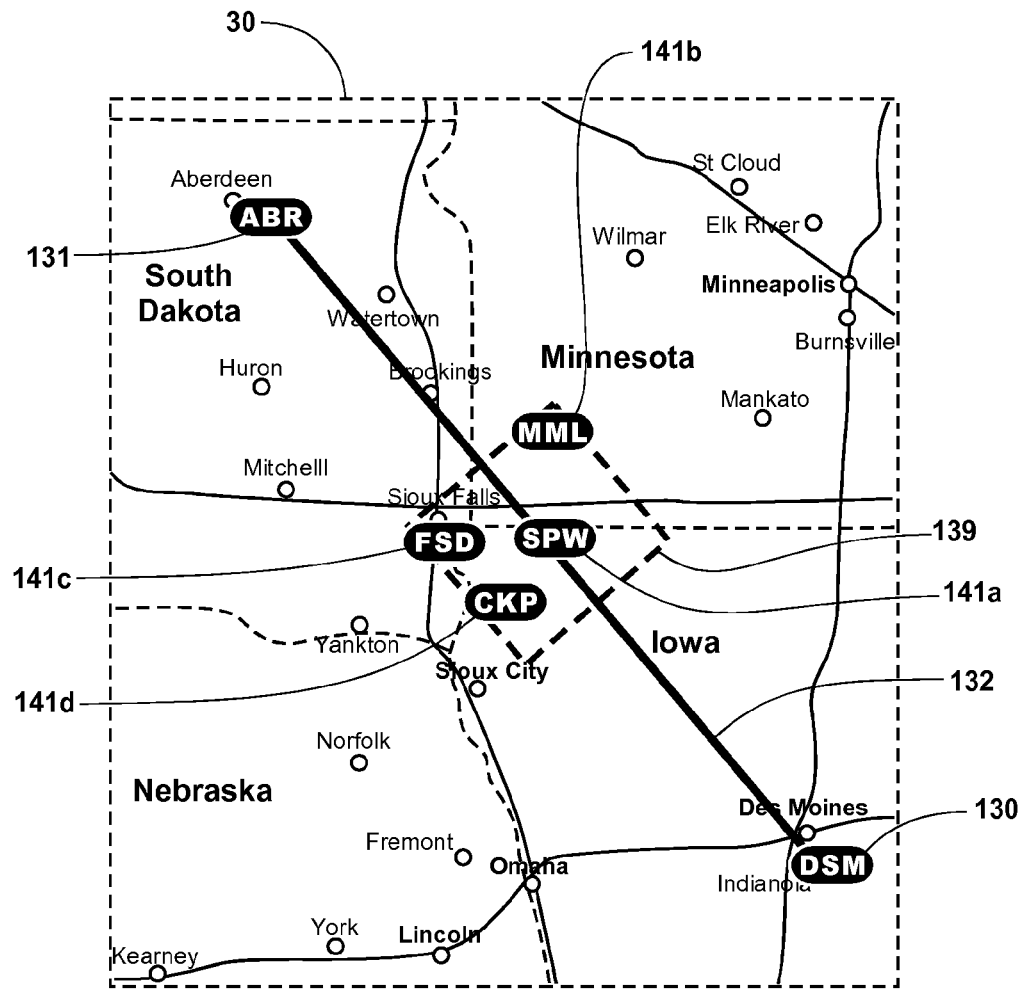
FIG. 4 is a diagram showing a flight trajectory rendered on a map and a determined refueling airport.

FIG. 4 is a diagram showing a flight trajectory 132 rendered on a map 30 and a determined refueling airport 141*a*. Also shown are a number of alternate airports 141*b*-141*d* in fuel target area 139 (i.e., an area within a predetermined range of the determined airport). More specifically, in FIG. 4, the origin airport 130 is Des Moines, Iowa (FAA airport identifier DSM) and the destination airport 131 is Aberdeen, S. Dak. (FAA airport identifier ABR). The determined refueling airport 141*a* is Spencer, Iowa airport 141*d* (FAA identifier SPW), and alternate airports 141*b*-141*d* in the fuel target area 139 are: the Marshall, Minnesota airport 141*b* (FAA identifier MML); the Sioux Falls, S. Dak. airport 141*c* (FAA identifier FSD); and the Cherokee, Iowa airport 141*d* (FAA identifier CKP). It should be noted that the fuel target area 139 covers three states.

Figure 5:
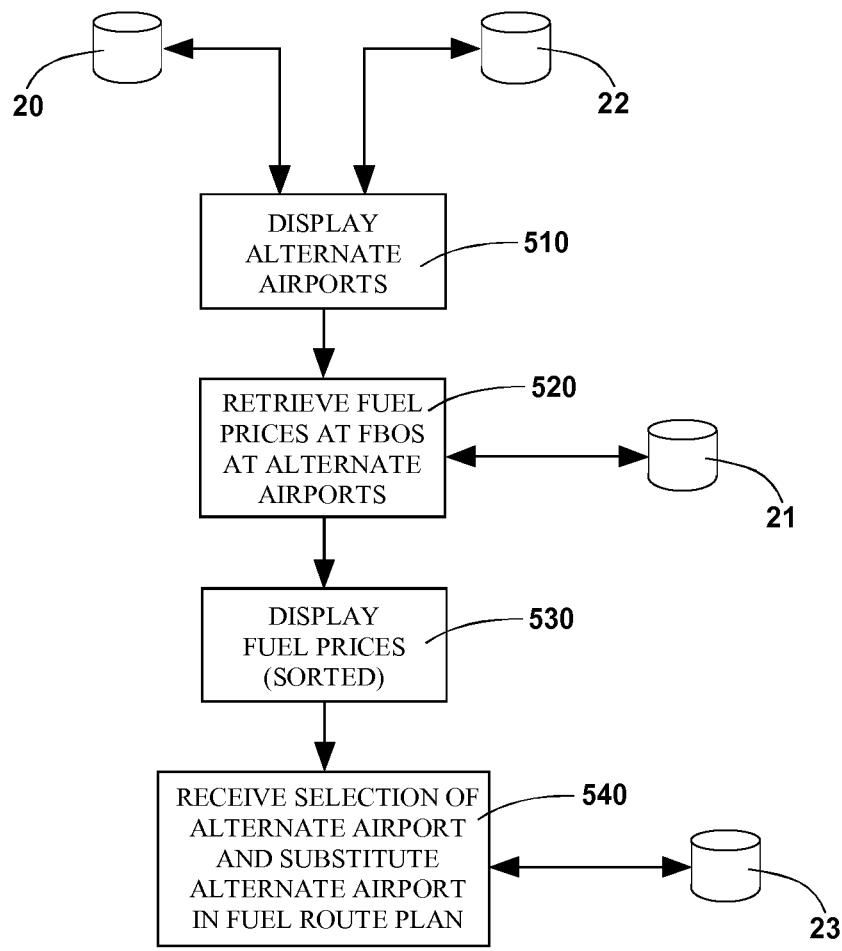
FIG. 5 is a flow chart further showing steps in the exemplary method of FIG. 2.

FIG. 5 shows further steps of the exemplary method 200 (FIG. 2), including: 510 displaying on the aeronautical/geospatial map alternate airports (e.g., 141*b*-141*d* (FIG. 4)) within a predetermined range of the determined refueling airport (e.g., 141*a* (FIG. 4)); 520 retrieving, from the FBO information database 21 (FIG. 1), fuel price information associated with FBOs located at the alternate airports (e.g., 141*b*-141*d* (FIG. 4)); and 530 displaying the fuel price information associated with the FBOs located at the alternate airports (e.g., 141*b*-141*d* (FIG. 4)). Step 530, displaying the fuel price information associated with the FBOs located at the alternate airports, includes displaying a list of the FBOs sorted by the fuel price information to aid identification of an FBO having a least expensive fuel price. FIG. 5 also shows the exemplary method 200 (FIG. 2) including the step of 540 receiving a selection of one of the alternate airports and substituting, in the fuel route plan, the one of the alternate airports for the refueling airport. If the destination airport (e.g., 131, (FIG. 4)) is within the aircraft range of the origin airport (e.g., 130 (FIG. 4)), the destination airport is selected as the refueling airport, although the user can select an alternate refueling/destination airport.

Figure 6:
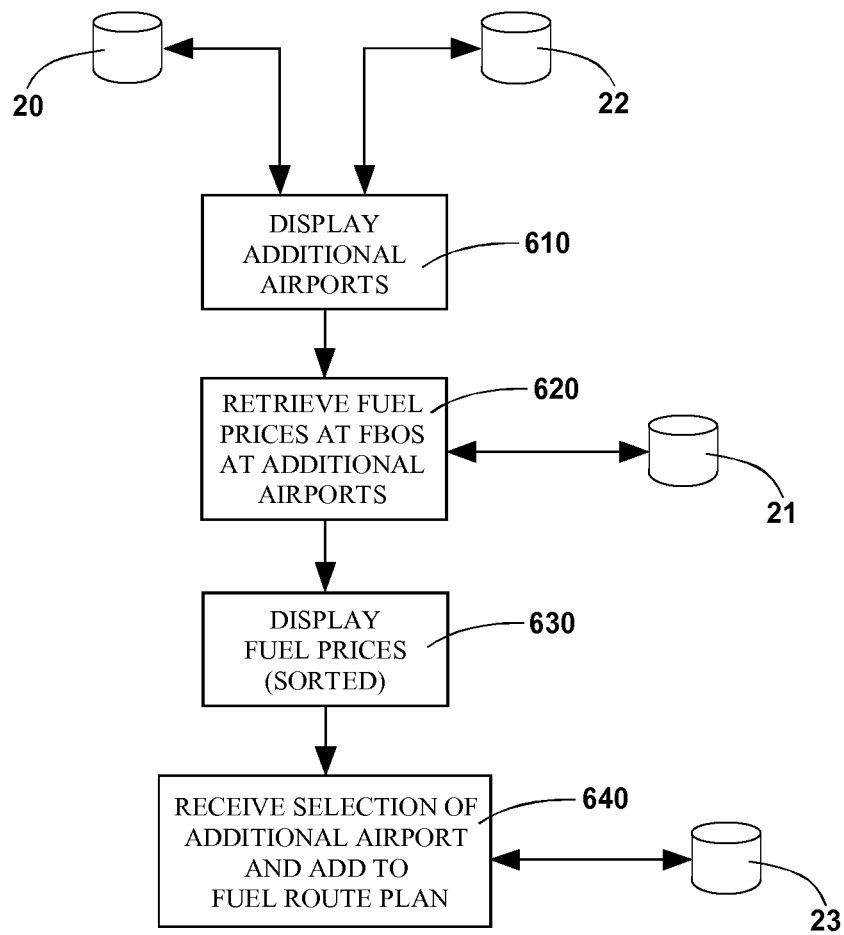
FIG. 6 is a flow chart further showing steps in the exemplary method of FIG. 2.

FIG. 6 shows even further steps of the exemplary method 200 (FIG. 2), including: 610 displaying on the aeronautical/geospatial map additional airports within a predetermined range of a selected set of coordinates (e.g., by clicking on any location on the aeronautical/geospatial map); 620 retrieving, from the FBO information database 21 (FIG. 1), fuel price information associated with FBOs located at the additional airports; and 630 displaying the fuel price information associated with the FBOs located at the additional airports. Step 630, displaying the fuel price information associated with the FBOs located at the additional airports, includes displaying a list of the FBOs sorted by the fuel price information to aid identification of an FBO having a least expensive fuel price. FIG. 6 also shows the exemplary method 200 (FIG. 2) including the step of 640 receiving a selection of one of the additional airports and adding, to the fuel route plan, the one of the alternate airports for the refueling airport. The user is given the option of adding the additional airport between existing "waypoints" or to the beginning or end of the fuel route plan.

In one embodiment, determining a fuel target area within which the aircraft must refuel to reach the destination airport includes determining the determined refueling airport to be the airport that is the closest to the aircraft range from the origin airport, without exceeding the aircraft range, and repeating until the desired destination airport is reached.

In another embodiment, determining a fuel target area within which the aircraft must refuel to reach the destination airport includes determining a fuel corridor having boundaries based on a lateral deviation value from the flight trajectory. If a distance between the origin airport and the destination airport is less than twice the aircraft range, then determining the fuel target area as being within the fuel corridor and bounded by a first distance limit based on the aircraft range from the origin airport and a second distance limit based on the aircraft range from the destination airport. However, if the distance between the origin airport and the destination airport is greater than or equal to twice the aircraft range, then determining the fuel target area as being within the fuel corridor and bounded by the origin airport and the first distance limit based on the aircraft range from the origin airport, making an airport of an FBO selected for refueling a new origin airport, and repeating until the destination airport is reached.

Figure 7:
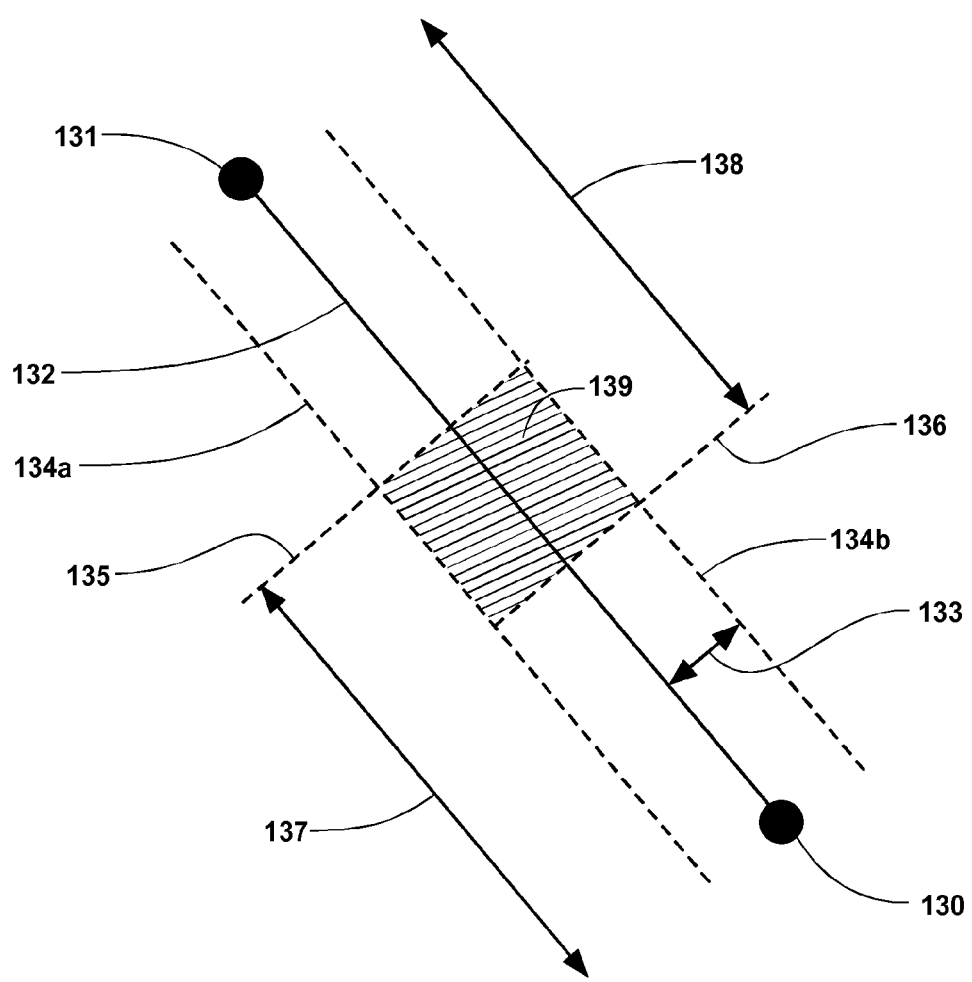
FIG. 7 is a diagram showing a origin airport and a destination airport, a trajectory, a fuel corridor defined by fuel corridor boundaries, and a fuel target area.

FIG. 7 is a diagram showing a origin airport 130 and a destination airport 131, a trajectory 132, a fuel corridor defined by fuel corridor boundaries 134*a*, 134*b*, and a fuel target area 139. A trajectory algorithm running on the central server computer 12 (FIG. 1) calculates the flight trajectory 132 by determining the shortest path between the origin airport 130 and the destination airport 131. Note that the shortest path may not be a straight line, as an aircraft may have to fly around mountains or FAA restricted areas. A corridor algorithm also running on the central server computer 12 (FIG. 1) calculates the fuel corridor having fuel corridor boundaries 134*a*, 134*b* determined based on the user-defined lateral deviation 133 from the flight trajectory 132. A fuel target area algorithm running on the central server computer 12 (FIG. 1) determines a first distance limit 135 based on an aircraft range 137 from the origin airport 130. The fuel target area algorithm creates a second distance limit 136 based on the aircraft range 138 from the destination airport 131. The area bounded by the fuel corridor boundaries 134*a*, 134*b*, the first distance limit 135, and the second distance limit 136 is the fuel target area 139. Note that the fuel target area 139 is drawn as a rectangle.

The shape of the fuel target area 139 can also be a circle or an oval that is defined by the same boundary and limit constraints.

Figure 8:
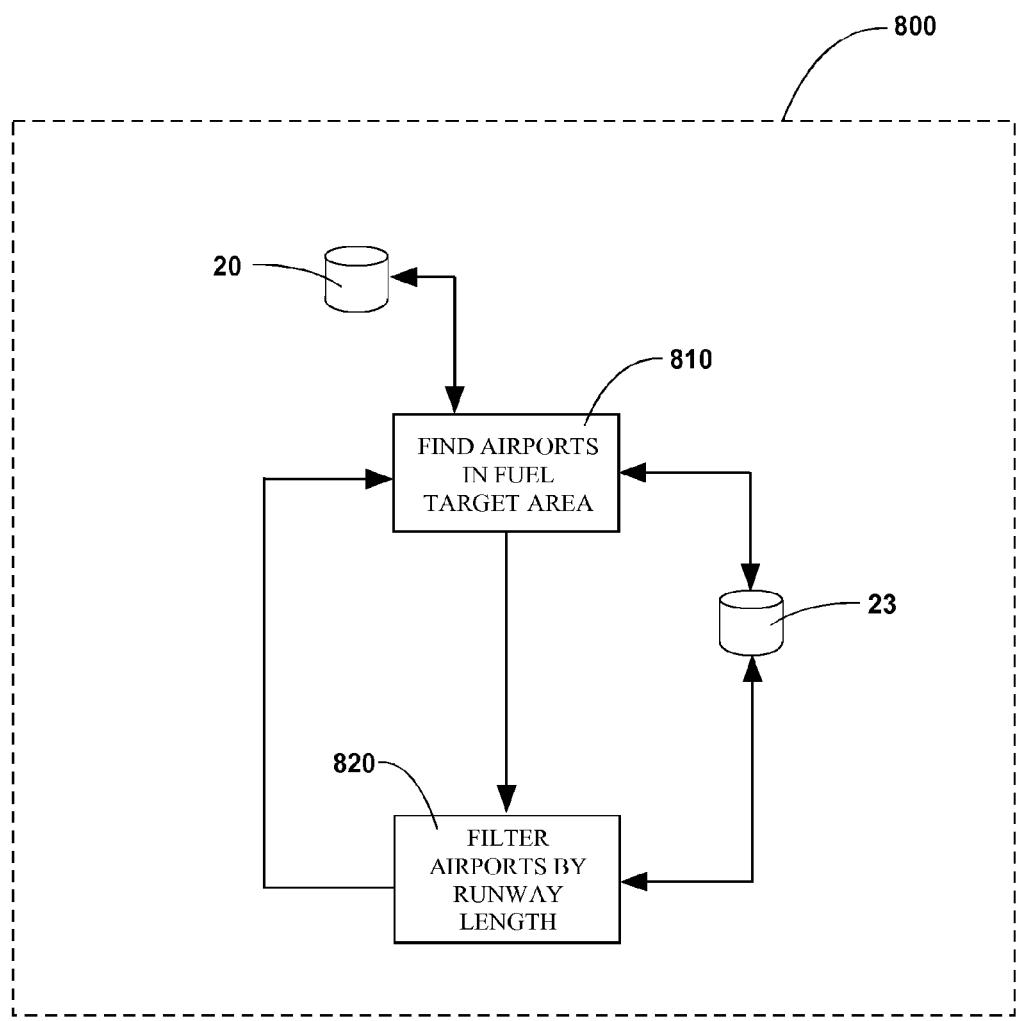
FIG. 8 is a flow chart further showing exemplary steps comprising a step of finding (determining) qualified airports within the fuel target area.

FIG. 8 is a flow chart further showing exemplary steps comprising a step 800 of finding (determining) qualified airports within the fuel target area 139. Step 810 is finding all airport in the fuel target area 139 (FIG. 7) using data from the airport information database 20 and the temporary memory buffer 23. Then, step 820 is filtering (i.e., removing) those airports that do not meet the runway length requirements, as determined by the aircraft type retrieved from the temporary memory buffer 23, to arrive at the qualified airports having a runway of sufficient length to accommodate the aircraft and being located with the fuel target area 139. The qualified airports are stored in the temporary memory buffer 23.

Figure 9:
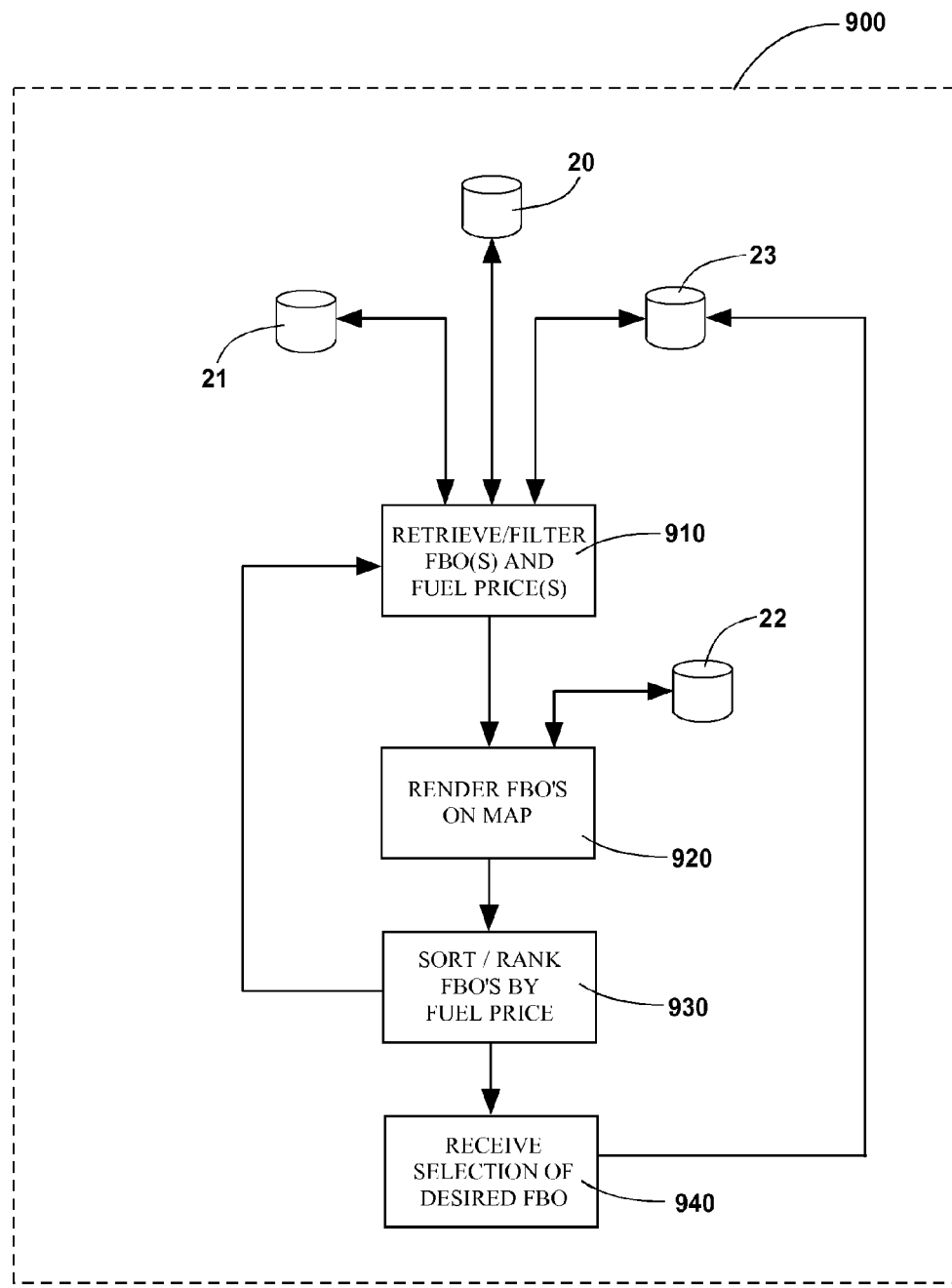
FIG. 9 is a flow chart further showing exemplary steps comprising a step of determining and presenting qualified FBOs at the qualified airports to the user via the dispatch user interface.

FIG. 9 is a flow chart further showing exemplary steps comprising a step 900 of determining and presenting qualified FBOs at the qualified airports to the user via the dispatch user interface 40 (FIG. 1). Step 910 is retrieving all FBOs located at the qualified airports from the FBO information database 21, and filtering those FBOs that do not carry the required fuel type, retrieved from the temporary memory buffer 23, for the aircraft to arrive at the qualified FBOs. If specified by the user, step 910 can also filter out all FBOs that do not recognize a specific aviation fuel card, or do not offer certain kinds of services (e.g. catering). With the filtered FBOs, the fuel prices associated with each FBO are retrieved from the FBO information database 21. Step 920 is rendering the qualified FBOs and flight trajectory on the aeronautical/geospatial map via the dispatch user interface 40 (FIG. 1), so that the user can select the most appropriate or desired FBO. Step 930 is sorting the qualified FBOs based on fuel price, so that the user can easily identify the most economical fuel price. A sorted list of qualified FBOs is preferably presented to the user in a side bar window on the dispatch user interface 40 (FIG. 1). Advantageously, this allows the user to select the most desired FBO is step 940, receive selection of a desired FBO.

Returning now to FIG. 7, if the distance between the origin airport 130 and the destination airport 131 is more than twice the aircraft range, multiple fuel target areas need to be established. In this event, the fuel target area algorithm determines the first fuel target area 139 as being from the origin airport 130 to the first distance limit 135. Once the user selects a refueling airport, that airport is then set as the origin airport, and the process is repeated until the destination airport 131 is reached (i.e., the final leg has been processed).

Once the user has selected the FBOs, all information is available to compile or prepare a fuel route plan. The fuel route plan is electronically stored for later referral or printed so that a pilot can use it in-flight. Further, once the fuel route plan is complete, the central server computer 12 can reserve fuel at the selected FBO(s) by communicating a fuel reservation to the FBO computer(s) 42 to reserve the appropriate amount(s) of fuel at the date and time specified. This guarantees the availability of the fuel and locks in a price. The exemplary system 10 (FIG. 1), as described herein electronically interfaces with a computerized inventory management system at the FBO.

Figure 10:
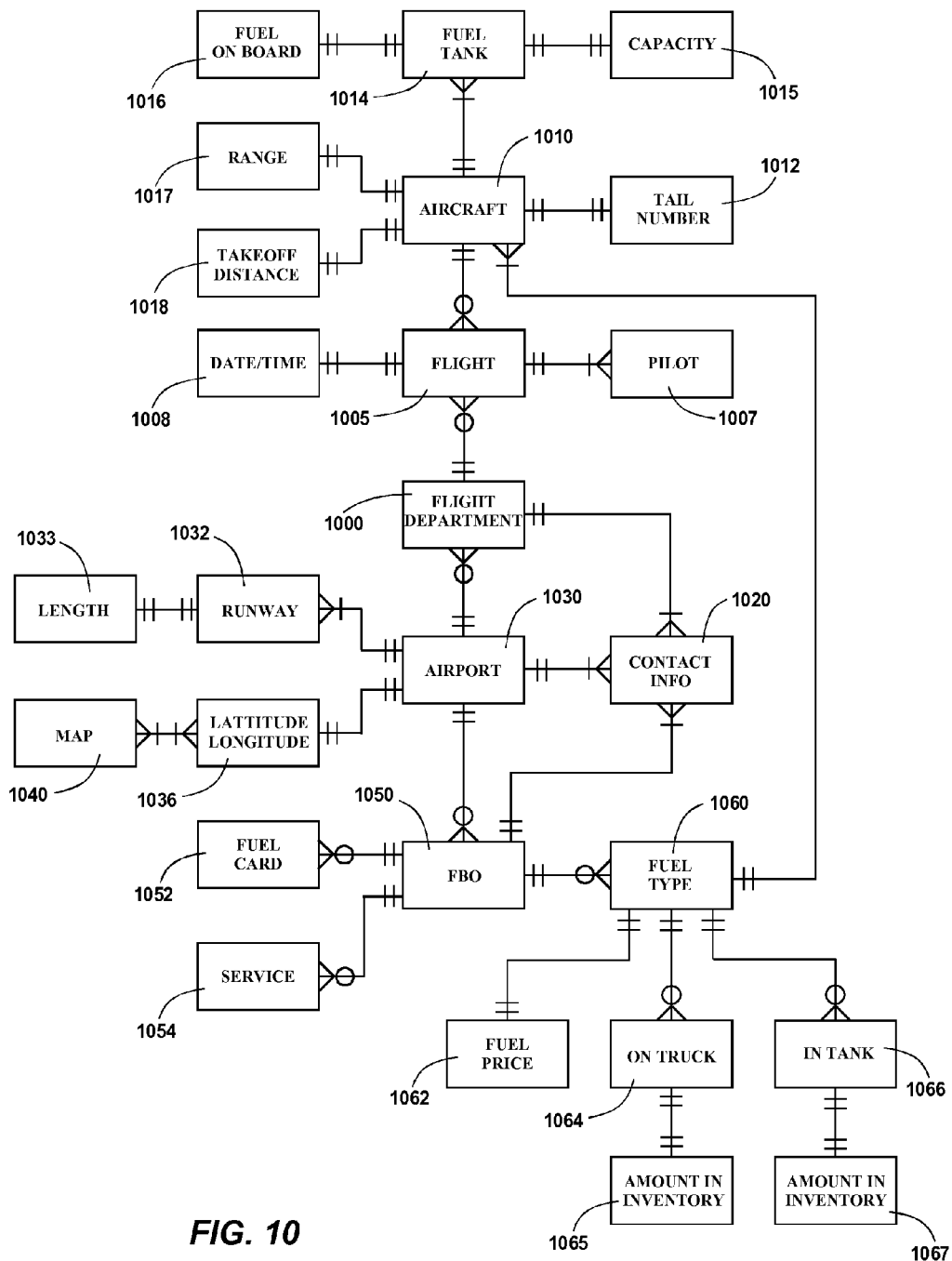
FIG. 10 is an entity relationship diagram showing the structure and cardinality of all data elements.
Figure 11:
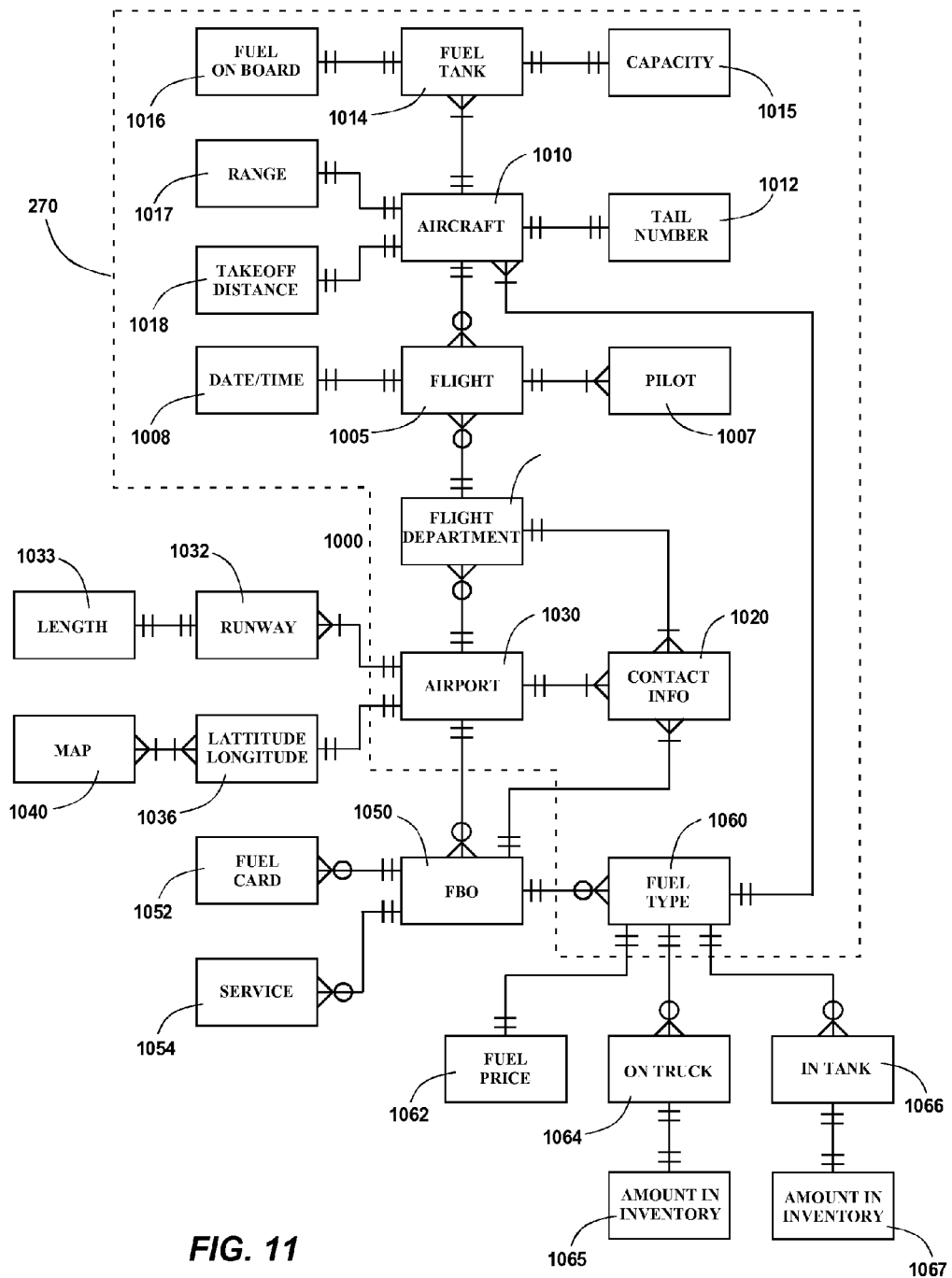
FIG. 11 is an entity relationship diagram indicating demand side data elements.
Figure 12:
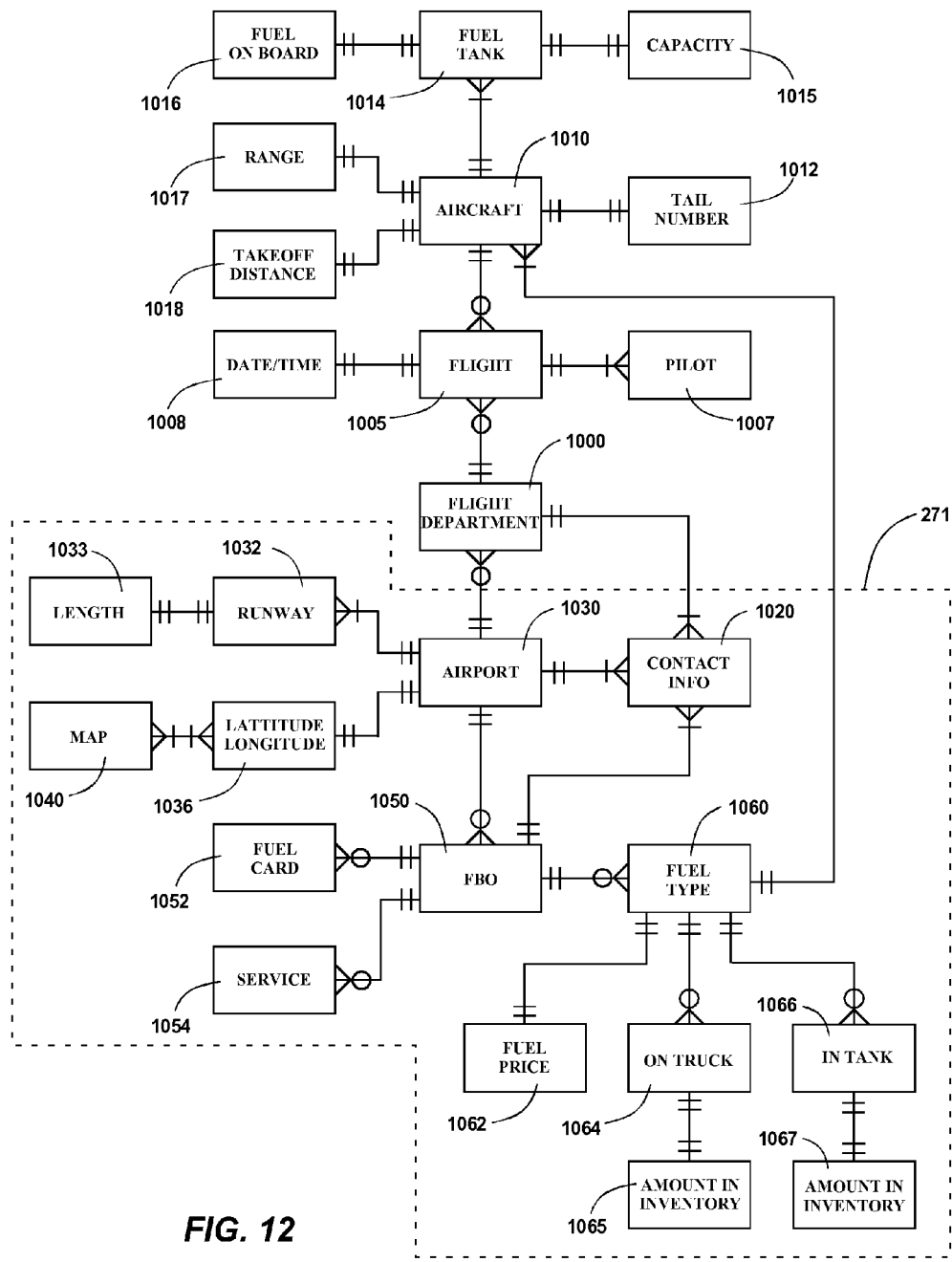
FIG. 12 is an entity relationship diagram indicating supply side data elements.

FIG. 10 shows the structure and cardinality of all data elements relevant to the present invention. These data elements can be viewed from two perspectives; the perspective of the flight department (which is the demand side) and the perspective of the FBO (which is the supply side). FIG. 11 shows the structure and cardinality of all data elements of a demand side area 270. FIG. 12 shows the structure and cardinality of all data elements of a supply side area 271. Advantageously, the exemplary system 10 (FIG. 1) and the exemplary method 200 (FIG. 2) facilitate coordination of the supply side and the demand side.

From the perspective of the flight department 1000, the flight department 1000 is always resident at an airport 1030. A resident or home airport may be used as a default origin airport. Not all airports 1030 have a resident flight department 1000. A flight department 1000 schedules flights 1005. Each flight 1005 requires an aircraft 1010, one or more pilots 1007, and a departure time 1008. Each aircraft 1010 has one or more fuel tanks 1014. Each of the tanks has a maximum capacity 1015 and an amount of fuel on board 1016.

Each aircraft 1010 can use only one fuel type 1060, which is used in filtering FBOs 1050 that do not carry the required fuel type 1060. Each aircraft 1010 has a range 1017, which is based in part on the fuel on board 1016. The range 1017 is used to establish the fuel target area 139, as explained above. Each aircraft 1010 also has a minimum landing and take-off distance 1018, which is based in part on the fuel on board 1016. The minimum landing and take-off distance 1018 is an essential determinant for selecting airports, as the runway length 1033 needs to exceed minimum landing and take-off distance 1018. Each aircraft also has a unique tail number 1012. As the tail number 1012 is associated with a single aircraft, all properties of the aircraft 1010 can be derived from the tail number 1012. For example, by selecting the tail number from a list of aircraft 1010 setup for a flight department 1000, many of the parameters can be automatically populated with a default value.

From the perspective of the FBO 1050, the FBO 1050 is also always resident at an airport 1030. Although an airport 1030 can have multiple FBOs 1050, not all airports 1030 have an FBO 1050. Each airport 1030 has a specific location, as defined by its latitude and longitude 1036 on a map 1040. In aviation, the type of map 1040 can be a geospatial map, a sectional map, an aeronautical map, or a weather map. Each airport 1030 has one or more runways 1032, each with a specific runway length 1033.

Most FBOs 1050 sell one or more fuel types 1060. Typical fuel types are JetA and 100 LL. Each of these types of fuel has a price 1062, which is frequently updated. Each fuel type 1060 can be stored on a truck 1064 or in on-site tanks 1066. The FBO 1050 keeps track of the amount in inventory on the truck 1065 and the amount of inventory in the tanks 1067.

In addition to fuel, FBOs 1050 also offer other services 1054 that are relevant and essential to operating an aircraft 1010. Services include catering, rental cars, interior detailing, maintenance and repair, and pilot lounges.

FBOs may or may not accept certain fuel cards 1052. These fuel cards 1052 offer fuel discounts and other benefits that affect the economics of running a flight department 1000. FBOs may be filtered based on services 1054 provided and fuel cards 1052 accepted.

The system of the present invention can be developed using the Microsoft platform, using SQL databases, ASP.NET, JavaScript, and AJAX to create an easy to use, highly interactive user experience. The aeronautical/geospatial maps can be from the FAA, Microsoft Virtual Earth, or Google Maps, each with its own Application Programming Interface (API).

JavaScript allows for object-oriented design and creates dynamic code that is fast and flexible. The JavaScript can employ an event tracker that reacts as needed to the changing environment.

The ASP.NET (C#) programming environment can be used as a highly customized query environment utilizing many aspects of .NET to optimize execution speed.

With the advent of broadband technology growing globally, applications running real time functions can be developed further. Programming in ASP.NET technology with the use of geospatial mapping is a feasible plan for the use of the Internet.

The word "exemplary" is used herein to mean serving as an example, instance, or illustration. Any aspect or design described herein as "exemplary" is not necessarily to be construed as preferred or advantageous over other aspects or designs. Further, for the purposes of this disclosure and unless otherwise specified, "a" or "an" means "one or more". The exemplary embodiments may be implemented as a process, machine, or article of manufacture using standard programming and/or engineering techniques to produce software, firmware, hardware, or any combination thereof to control a computer to implement the disclosed embodiments.

The foregoing description of exemplary embodiments of the invention have been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A method for fuel route planning comprising:
   receiving, from a fuel route plan user via a dispatch user interface of a dispatch computer, an origin airport and a destination airport for a flight of an aircraft;
   determining, by a central server computer in communication with the dispatch computer through a network, a flight trajectory between the origin airport and the destination airport;
   receiving, from the fuel route plan user via the dispatch user interface of the dispatch computer, a lateral deviation value from the flight trajectory;
   determining, by the central server computer in communication with the dispatch computer through the network, a fuel corridor having boundaries based on the lateral deviation value from the flight trajectory;
   determining a fuel target area within which the aircraft must refuel to reach the destination airport, the fuel target area including side boundaries corresponding to the fuel corridor, a first end boundary corresponding to a first distance limit based on an aircraft range from the origin airport, and a second end boundary corresponding to a second distance limit based on an aircraft range from the destination airport;
   retrieving, by the central server computer from an airport information database, a plurality of refueling airports located within the fuel corridor;
   retrieving, by the central server computer from an FBO information database, fuel price information associated with a plurality of FBOs located at the plurality of refueling airports;
   rendering, on a dispatch user interface of the dispatch computer, the flight trajectory and the plurality of refueling airports on an aeronautical/geospatial map using information from an aeronautical/geospatial mapping information database; and
   displaying, on the dispatch user interface of the dispatch computer, the fuel price information associated with the plurality of FBOs located at the plurality of refueling airports for use in compiling a fuel route plan.

2. The method of claim 1, further comprising:
   receiving an aircraft range indicating a maximum distance that the aircraft can safely fly;
   determining a determined refueling airport from the plurality of refueling airports based on the aircraft range; and
   displaying the determined refueling airport on the aeronautical/geospatial map.

3. The method of claim 2, further comprising:
   displaying on the aeronautical/geospatial map alternate airports within a predetermined range of the determined refueling airport;
   retrieving, from the FBO information database, fuel price information associated with FBOs located at the alternate airports; and
   displaying the fuel price information associated with the FBOs located at the alternate airports.

4. The method of claim 3, wherein displaying the fuel price information associated with the FBOs located at the alternate airports includes displaying a list of the FBOs sorted by the fuel price information to aid identification of an FBO having a least expensive fuel price.

5. The method of claim 3, further comprising receiving a selection of one of the alternate airports and substituting, in the fuel route plan, the one of the alternate airports for the refueling airport.

6. The method of claim 3, wherein the destination airport is the refueling airport.

7. The method of claim 2, further comprising:
   displaying on the aeronautical/geospatial map additional airports within a predetermined range of a selected set of coordinates;
   retrieving, from the FBO information database, fuel price information associated with FBOs located at the additional airports; and
   displaying the fuel price information associated with the FBOs located at the additional airports.

8. The method of claim 7, wherein displaying the fuel price information associated with the FBOs located at the additional airports includes displaying a list of the FBOs sorted by the fuel price information to aid identification of an FBO having a least expensive fuel price.

9. The method of claim 7, further comprising receiving a selection of one of the additional airports and adding the one of the additional airports to the fuel route plan.

10. The method of claim 1, further comprising:
    obtaining a runway length requirement for the aircraft; and
    filtering, using the runway length requirement for the aircraft, the plurality of refueling airports retrieved from the airport information database to include only refueling airports having a runway of sufficient length to accommodate the aircraft.

11. The method of claim 1, further comprising:
    obtaining a fuel type requirement for the aircraft; and
    filtering, using the fuel type requirement for the aircraft, the plurality of refueling airports retrieved from the airport information database to include only refueling airports having an FBO having fuel of a required fuel type for the aircraft.

12. The method of claim 1, further including:
    receiving, from a plurality of FBOs, fuel price information; and
    saving the fuel price information from the plurality of FBOs in the FBO information database.

13. The method of claim 1, further comprising communicating a fuel reservation to a selected FBO in response to receiving a request to make the fuel reservation at the selected FBO.

14. A non-transitory computer-readable storage medium with an executable program stored thereon for fuel route planning, wherein the program instructs a processor to perform the following steps:
- receive, from a fuel route plan user via a dispatch user interface, an origin airport and a destination airport for a flight of an aircraft and an aircraft range indicating a maximum distance that the aircraft can safely fly;
- determine a flight trajectory between the origin airport and the destination airport;
- receive, from the fuel route plan user via the dispatch user interface of the dispatch computer, a lateral deviation value from the flight trajectory;
- retrieve, from an airport information database, a plurality of refueling airports located adjacent to the flight trajectory;
- retrieve, from an FBO information database, fuel price information associated with a plurality of FBOs located at the plurality of refueling airports;
- present, to the fuel route plan user via the dispatch user interface, the flight trajectory and the plurality of refueling airports on an aeronautical/geospatial map using information from an aeronautical/geospatial mapping information database;
- display, to the fuel route plan user via the dispatch user interface, the fuel price information associated with the plurality of FBOs located at the plurality of refueling airports for use in compiling a fuel route plan; and
- determine a fuel target area within which the aircraft must refuel to reach the destination airport,
- wherein the determine the fuel target area step includes:
  - determine a fuel corridor having boundaries based on the lateral deviation value from the flight trajectory,
  - if a distance between the origin airport and the destination airport is less than twice the aircraft range, then determine the fuel target area as being within the fuel corridor and bounded by a first distance limit based on the aircraft range from the origin airport and a second distance limit based on the aircraft range from the destination airport, and
  - if the distance between the origin airport and the destination airport is greater than or equal to twice the aircraft range, then determine the fuel target area as being within the fuel corridor and bounded by the origin airport and the first distance limit based on the aircraft range from the origin airport, make an airport of an FBO within the fuel target area a new origin airport, and repeat until the destination airport is reached.

15. The computer-readable storage medium of claim 14, wherein the program further instructs the processor to:
- determine a determined refueling airport from the plurality of refueling airports based on the aircraft range; and
- display, to the fuel route plan user via the dispatch user interface, the determined refueling airport on the aeronautical/geospatial map.

16. The computer-readable storage medium of claim 14, wherein the program further instructs the processor to:
- receive, from the fuel route plan user via the dispatch user interface, information to determine a runway length requirement for the aircraft; and
- filter, using the runway length requirement for the aircraft, the plurality of refueling airports retrieved from the airport information database to include only refueling airports having a runway of sufficient length to accommodate the aircraft.

17. The computer-readable storage medium of claim 14, wherein the program further instructs the processor to:
- receive, from the fuel route plan user via the dispatch user interface, a fuel type requirement for the aircraft; and
- filter, using the fuel type requirement for the aircraft, the plurality of refueling airports retrieved from the airport information database to include only refueling airports having an FBO having fuel of a required fuel type for the aircraft.

18. The computer-readable storage medium of claim 14, wherein the program further instructs the processor to:
- receive, from FBO users via a respective FBO user interface, fuel price information; and
- save the fuel price information in the FBO information database.

19. The computer-readable storage medium of claim 14, wherein the program further instructs the processor to:
- receive, from the fuel route plan user via the dispatch user interface, a request to make a fuel reservation with a selected qualified FBO; and
- communicate the request to make the fuel reservation to the selected qualified FBO.

20. A method for fuel route planning comprising:
- receiving, from a fuel route plan user via a dispatch user interface of a dispatch computer, an origin airport and a destination airport for a flight of an aircraft and an aircraft range indicating a maximum distance that the aircraft can safely fly;
- determining, by a central server computer in communication with the dispatch computer through a network, a flight trajectory between the origin airport and the destination airport;
- receiving, from the fuel route plan user via the dispatch user interface of the dispatch computer, a lateral deviation value from the flight trajectory;
- determining, by the central server computer in communication with the dispatch computer through the network, a fuel corridor having boundaries based on the lateral deviation value from the flight trajectory;
- retrieving, by the central server computer from an airport information database, a plurality of refueling airports located within the fuel corridor;
- retrieving, by the central server computer from an FBO information database, fuel price information associated with a plurality of FBOs located at the plurality of refueling airports;
- rendering, on a dispatch user interface of the dispatch computer, the flight trajectory and the plurality of refueling airports on an aeronautical/geospatial map using information from an aeronautical/geospatial mapping information database;
- displaying, on the dispatch user interface of the dispatch computer, the fuel price information associated with the plurality of FBOs located at the plurality of refueling airports for use in compiling a fuel route plan; and
- determining a fuel target area within which the aircraft must refuel to reach the destination airport,
- wherein determining the fuel target area step includes:
  - if a distance between the original airport and the destination airport is less than twice the aircraft range, then determining the fuel target area as being within the fuel corridor and bounded by a first distance limit based on the aircraft range from the origin airport and a second distance limit based on the aircraft range from the destination airport, and if the distance between the origin airport and the destination airport is greater than or equal to twice the aircraft range, then determining the fuel target area as being within the fuel corridor and bounded by the origin airport and the first distance limit based on the aircraft range from the origin airport, making an airport of an FBO within the fuel target area a new origin airport, and repeating until the destination airport is reached.

* * * * *